(12) United States Patent
Mason

(10) Patent No.: US 9,651,178 B2
(45) Date of Patent: May 16, 2017

(54) AEROSOL CAN SPRAY NOZZLE EXTENSION TUBE CONNECTOR

(71) Applicant: Tyler Mason, Burbank, CA (US)

(72) Inventor: Tyler Mason, Burbank, CA (US)

( * ) Notice: Subject to any disclaimer, the term of this patent is extended or adjusted under 35 U.S.C. 154(b) by 0 days.

(21) Appl. No.: 14/928,262

(22) Filed: Oct. 30, 2015

(65) Prior Publication Data

US 2016/0084417 A1 Mar. 24, 2016

Related U.S. Application Data

(63) Continuation of application No. 14/490,510, filed on Sep. 18, 2014.

(51) Int. Cl.

| | |
|---|---|
| *B05B 7/32* | (2006.01) |
| *F23D 11/24* | (2006.01) |
| *F23D 14/28* | (2006.01) |
| *F23D 14/34* | (2006.01) |
| *F16L 25/00* | (2006.01) |
| *B65D 83/30* | (2006.01) |
| *B05B 12/00* | (2006.01) |
| *B65D 83/20* | (2006.01) |
| *B65D 83/44* | (2006.01) |
| *B05B 15/00* | (2006.01) |
| *F16L 37/02* | (2006.01) |

(52) U.S. Cl.
CPC ........ *F16L 25/0018* (2013.01); *B05B 12/002* (2013.01); *B05B 15/00* (2013.01); *B65D 83/20* (2013.01); *B65D 83/303* (2013.01); *B65D 83/44* (2013.01); *F16L 37/02* (2013.01)

(58) Field of Classification Search
CPC ...... B65D 83/00; B65D 83/132; A62C 13/62; A62C 13/66; A62C 35/58; B05B 9/03; B05B 7/32; F23D 11/24; F23D 14/28; F23D 14/34; F23D 11/06; A01G 25/14
USPC .............. 403/293, 300, 292, 220, 215, 216; 239/302, 327, 337, 338, 375, 223, 381, 239/424, 424.5, 102.1, 589.1; 222/402.1, 222/402.13
See application file for complete search history.

(56) References Cited

U.S. PATENT DOCUMENTS

| | | | | |
|---|---|---|---|---|
| 3,142,421 A | * | 7/1964 | Sieracki | A01C 7/02 |
| | | | | 222/466 |
| 3,216,628 A | * | 11/1965 | Fergusson | B65D 83/303 |
| | | | | 222/402.1 |
| 3,700,174 A | * | 10/1972 | Beck | B05B 15/068 |
| | | | | 239/280 |
| 4,991,750 A | * | 2/1991 | Moral | B65D 83/303 |
| | | | | 222/402.24 |
| 5,154,323 A | * | 10/1992 | Query | B65D 83/205 |
| | | | | 222/153.11 |

(Continued)

*Primary Examiner* — Justin Jonaitis
(74) *Attorney, Agent, or Firm* — James A. Italia; Italia IP

(57) ABSTRACT

Provided is an adapter configured for use with an aerosol can spray nozzle and an extension tube. The adapter is configured to fit onto an extension tube and to receive a second extension tube to provide a more rigid and fluidly secure connection between the extension tubes. The adapter includes a portion for a first extension tube and a second extension tube portion. Each extension tube portion includes an inner channel extending therethrough, and is sized and configured to allow the extension tube to be insertable therein to create friction-tight engagement between the extension tube and the adapter.

7 Claims, 4 Drawing Sheets

(56) References Cited

U.S. PATENT DOCUMENTS

| | | | | |
|---|---|---|---|---|
| 5,427,624 A | * | 6/1995 | Laventure | A01M 9/0076 |
| | | | | 134/8 |
| 6,783,037 B1 | * | 8/2004 | Bonham | B65D 83/303 |
| | | | | 222/402.1 |

* cited by examiner

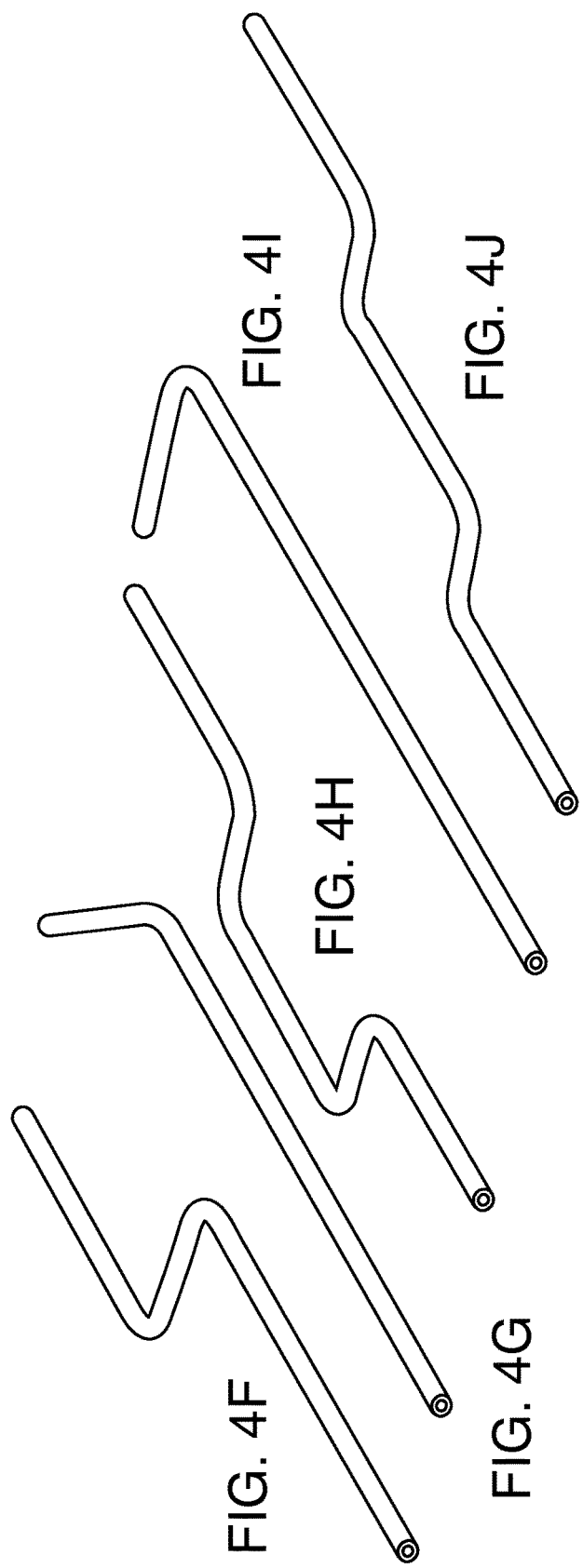

AEROSOL CAN SPRAY NOZZLE EXTENSION TUBE CONNECTOR

CROSS-REFERENCE TO RELATED APPLICATION

This application is a Continuation-in-Part of and claims the benefit of the filing date under 35 USC §120 of patent application Ser. No. 14/490,510, filed Sep. 18, 2014, the contents of which are incorporated herein by reference.

STATEMENT RE: FEDERALLY SPONSORED RESEARCH/DEVELOPMENT (Not Applicable)

BACKGROUND OF THE INVENTION

1. Field of the Invention

The present invention relates generally to an adapter for extension tubes for use with an aerosol can, and more specifically, to an adapter configured to connect two extension tubes to allow engagement between the two extension tubes.

2. Description of the Related Art

Aerosol cans are well-known in the art and are extensively used to deliver a wide variety of products, including lubricants, paints, personal care products, food products, insulation and caulks, herbicides and insecticides, as well as compressed air for cleaning. In recent years, annual production of aerosol cans in the United States alone has surpassed 10 billion cans.

Aerosol cans generally include a can body defining an internal reservoir or chamber which stores a pressurized gas/liquid mixture to be dispensed through a spray nozzle connected to the can's dispensing mechanism, i.e., valve stem, orifice, etc. Aerosol cans are typically operated by depressing the spray nozzle to actuate dispensing of the contents stored within the internal reservoir. The spray nozzle may be specifically designed to control the spray pattern and droplet size of the fluid emitted from the aerosol can.

Some aerosolized products require precise control onto remote, hard to reach areas. Current methods of dispensing such products may employ a spray nozzle having an orifice sized to allow for insertion of an extension tube so that the point of disbursement is on the order of a few inches to several inches away from the spray nozzle (depending on the size of the extension tube).

Typically, the extension tubes are seated within a recess formed about the fluid dispensing orifice in the spray nozzle to connect the extension tubes to the spray nozzle and to facilitate fluid communication there between. Thus, as the spray nozzle emits the product, the product travels through the extension tube and is emitted out an end portion thereof.

A common deficiency associated with aerosol cans and extension tubes relates to the ability of an aerosol can with extension tube attached to reach areas that are not within reach of a single extension tube, or areas that do not allow the aerosol can to be maneuvered freely. Current solutions for reaching difficult to reach areas with aerosolized sprays require jury-rigging straws together with adhesive tape, glue or other means of attaching straws together. The user may attempt to connect two or more straws together, resulting in an inefficient delivery of aerosolized spray; adhesive tape is prone to failure because the pressurized substances travelling through the extension tubes can dislodge the tape, allowing the aerosol to escape before reaching its intended destination.

Accordingly there is a need in the art for a device which can improve the connection between extension tubes to mitigate unwanted disconnection between said extension tubes.

The present invention addresses this particular need, as will be discussed in more detail below.

BRIEF SUMMARY OF THE INVENTION

According to an aspect of the present invention, there is provided a removable adapter configured for use with two extension tubes. The adapter is configured to fit onto the distal end of an extension tube and to receive the proximal end of an extension tube to provide a more rigid and fluidly secure connection between the extension tubes.

According to one embodiment, the adapter includes an adapter body having a first surface, a second surface, and a side surface extending between the first and second surfaces. The first and second surfaces each have one opening that is configured with tolerances as to allow the adapter to squeeze/grip an extension tube. An inner channel extends from the first surface to the second surface; the center of the channel contains a constriction section that narrows the inner channel to a diameter substantially equal to the inner diameter of that of the extension tube, stopping the tube from crossing the center of the adapter, and creating a continuous and substantially uniform flow channel.

The inner channel of the adapter body may be configured to allow the extension tube to be inserted therein by a first force and to allow the extension tube to be removed by a second force equal to or greater than the first force. Along these lines, the adapter body may include a plurality of projections extending into the inner channel to facilitate the friction-tight engagement between the adapter body and the extension tube. The adapter body may additionally include a plurality of annular protrusions extending into the inner channel to facilitate the friction-tight engagement between the adapter body and the extension tube. The adapter body may further include a helical protrusion extending into the inner channel to facilitate friction-tight engagement between the adapter body and the extension tube.

The adapter body may be formed from a resilient material, such as rubber, plastic or the like to allow the inner channel to expand to increase the size of the opening. The material used should ideally have a hardness rating of 75 on the Shore A hardness scale. This level of hardness would allow for an expandable friction fit that is hard enough to prevent backwash of the aerosol; backflow could potentially blow the adapter off of a straw. The opening may then decrease in size, i.e., contract, around the extension tube to tightly engage the tube. It is contemplated that a suitable material may include ENFLEX®. However, the instant invention may include alternative materials suitable to achieve the functionality and purposes herein.

The present invention is best understood by reference to the following detailed description when read in conjunction with the accompanying drawings.

BRIEF DESCRIPTION OF THE DRAWINGS

The features and advantages of the various embodiments disclosed herein will be better understood with respect to the following description and drawings in which like numbers refer to like parts throughout and in which:

FIG. 1 is a side view of an adapter for securely and fluidly connecting two extension tubes;

DETAILED DESCRIPTION OF THE INVENTION

The detailed description that follows is intended to describe the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by a variety of different embodiments and that they are also intended to be encompassed within the scope of the invention.

Figure 1:
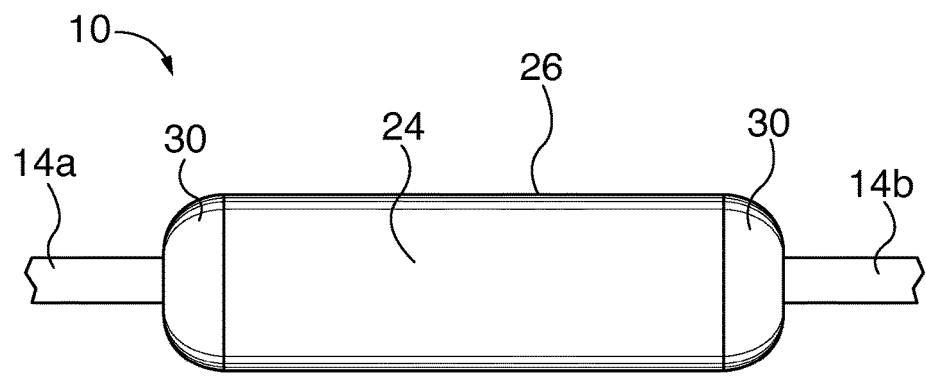

Referring now to FIG. 1, there is shown an adapter 10 for securely connecting an extension tube 14a to a second extension tube 14b. The adapter 10 is configured to be easily connected to the first extension tube 14a, and to allow the extension tube 14a to fluidly connect the second extension tube 14b. The adapter 10 is configured to frictionally engage the first extension tube 14a and second extension tube 14b to maintain the engagement and fluid connection between the first extension tube 14a and the second extension tube 14b during usage. In this regard, the adapter 10 prevents leakage between the first extension tube 14a and second extension tube 14b. The adapter 10 is also configured to allow for disassembly of the first extension tube 14a from the second extension tube 14b during nonuse of the adapter 10.

Figure 2:
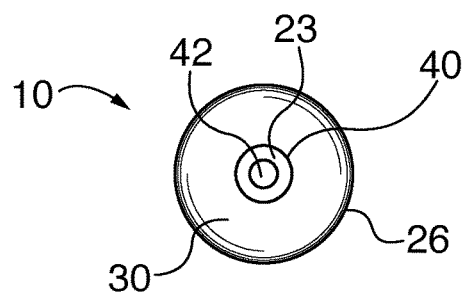
FIG. 2 is a view of one end of an adapter for securely and fluidly connecting two extension tubes.

Referring now specifically to FIGS. 1 and 2, the adapter 10 includes an adapter body 24 having a first surface 26 extending generally across the adapter body 24, and two side surfaces 30. Those skilled in the art will appreciate that the surfaces 26, 30 are not limited to planar surfaces, and that the surfaces 26, 30 may be angled, slanted, curved, arcuate, etc. without departing from the spirit and scope of the present invention.

Figure 3A:
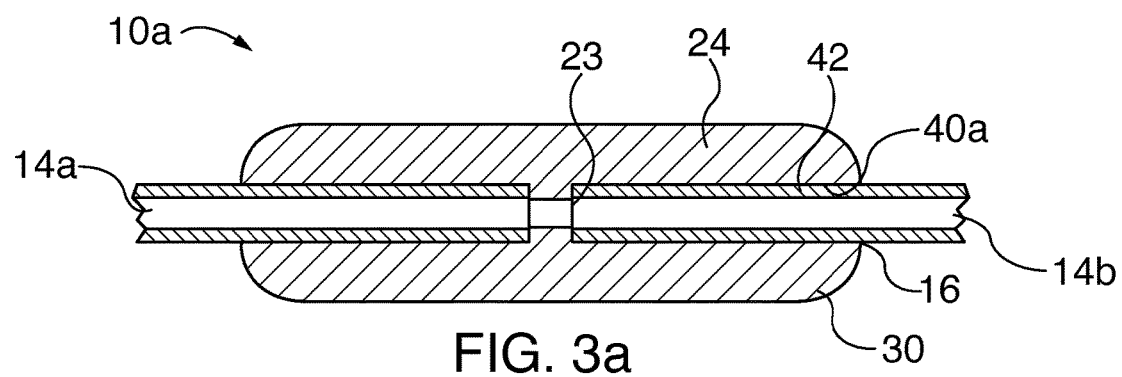
FIG. 3A is a cross-sectional view of the adapter.

Now, referring specifically to FIGS. 2 and 3a, an inner wall 40 extending from the side wall 30 to the inner recess 23 define an inner channel 42. The inner channel 42 is sized and configured to allow the extension tube 14 to be insertable therein to engage with the spray nozzle 12, as shown in FIG. 3a. When an end portion of the extension tube 14a is inserted within the inner channel 42, the end of the extension tube 14 may seat within the recess 23 formed within the adapter 10 to fluidly connect the extension tube 14a to the extension tube 14b. Therefore, when the extension tube 14a is connected to the adapter 10 fluid may be communicated from the first extension tube 14a to the second extension tube 14b.

The inner channel 42 is sized and configured to mitigate inadvertent removal of the extension tube 14 therefrom. According to one embodiment, the inner channel 42 frictionally engages the extension tube 14 to maintain the extension tube 14 in fluid connection with the spray nozzle 12. In this regard, in order to remove the extension tube 14 from the spray nozzle 12 and adapter 10, a force must be applied to the extension tube 14 to overcome the frictional engagement between the extension tube 14 and the adapter 10.

The size of the inner channel 42 may expand during insertion of the extension tubes 14a, 14b and subsequently contract around the extension tubes 14a, 14b to tightly engage the extension tubes 14a, 14b. Thus, the diameter or other peripheral dimension of the inner channel 42 may be smaller than the corresponding dimension of the extension tubes 14a, 14b (i.e., the outer diameter), such that insertion of the extension tubes 14a, 14b causes the inner channel 42 to expand and impart a frictional force on the extension tubes 14a, 14b.

Figure 3B:
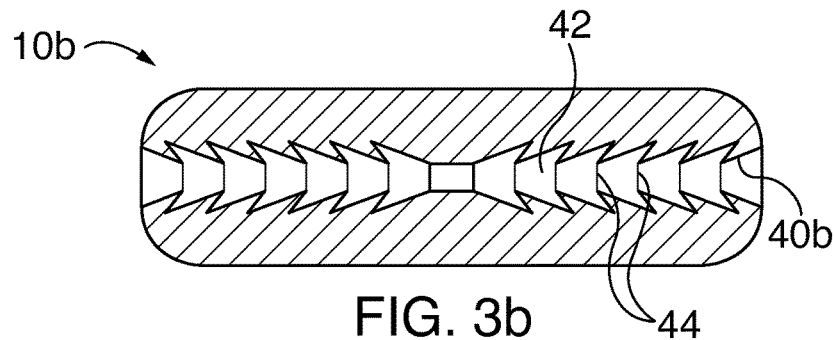
FIG. 3B is a cross sectional view of another embodiment of the adapter including uni-directional teeth formed within an inner channel.

FIGS. 3B-3E show several side sectional views of various embodiments of the adapter body wherein the inner channel is configured to maintain engagement between the adapter body and the extension tube. Referring now specifically to FIG. 3B, there is shown an embodiment of the adapter 10b wherein the second inner wall 40b defines a plurality of unidirectional teeth 44 extending at an angle into the inner channel 42 toward the first inner wall 36. The uni-directional teeth 44 make it easier to insert the extension tubes 14a, 14b into the inner channel 42 and more difficult to remove the extension tubes 14a, 14b from the inner channel 42. Thus, a first force may be used to insert the extension tubes 14a, 14b into the inner channel 42 and a second force may be required to remove the extension tubes 14a, 14b from the inner channel 42, wherein the second force is larger than the first force.

Figure 3C:
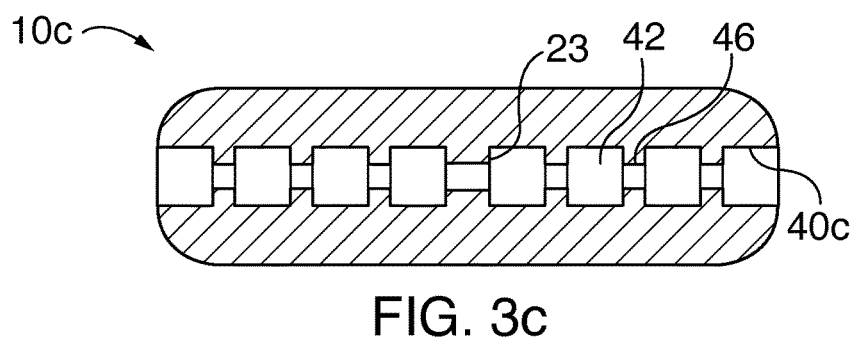
FIG. 3C is a cross sectional view of another embodiment of the adapter including a plurality of annular protrusions formed within an inner channel.

Referring now specifically to FIG. 3C, there is shown another embodiment of the adapter 10c wherein the inner channel 42 is configured to maintain the first extension tube 14a in fluid engagement with the second extension tube 14b. In the embodiment shown in FIG. 3C, the second inner surface 40c forms a plurality of concentric annular rings 46 which extend into the inner channel 42. The rings 46 are configured to allow the extension tubes 14a, 14b to be inserted therein and to exert a frictional force on the extension tubes 14a, 14b to make it difficult to remove the extension tubes 14a, 14b. In this regard, the rings 46 define an opening having an inner diameter that is sized to receive the extension tubes 14a, 14b in friction tight engagement.

Figure 3D:
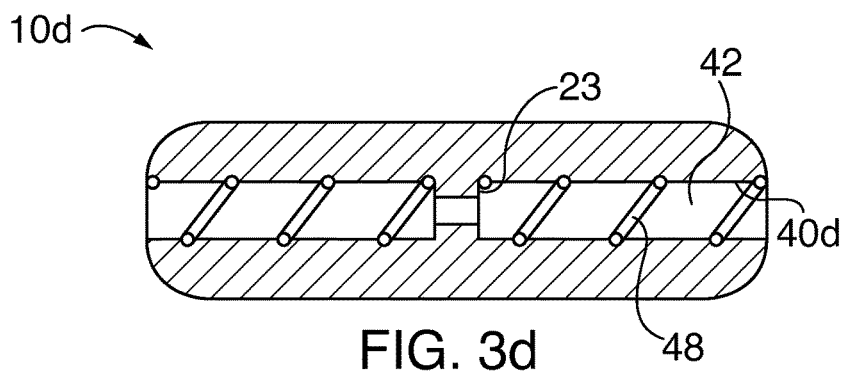
FIG. 3D is a cross sectional view of a further embodiment of the adapter including a helical projection formed within an inner channel.

Referring now specifically to FIG. 3D, there is shown a different embodiment of the adapter 10c, wherein the second inner surface 40d forms a helical protrusion 48 extending into the inner channel 42. The helical protrusion 48 provides a frictional force similar to the annular rings 46 or teeth 44 discussed above to "grip" the extension tubes 14a, 14b when the extension tubes 14a, 14b is inserted within the inner channel 42. The helical protrusion 48 defines an opening which is sized to allow the extension tubes 14a, 14b to be inserted therein and to allow the helical protrusion 48 to frictionally engage the extension tubes 14a, 14b.

Figure 3E:
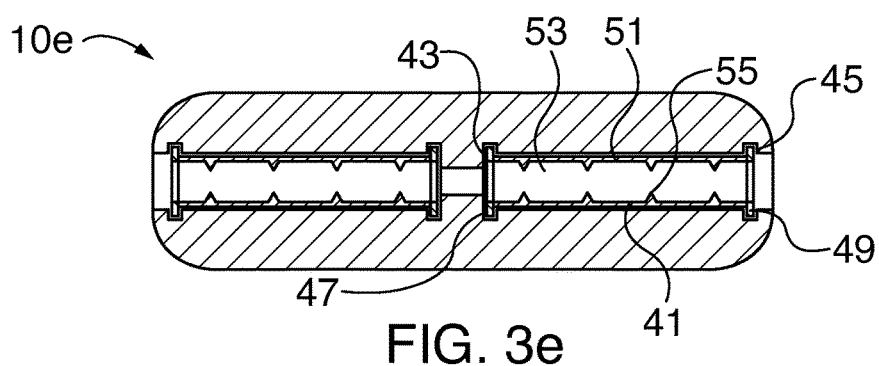
FIG. 3E is a cross sectional view of still another embodiment of the adapter including a gripping insert disposed within the inner channel; and, FIGS. 4A-4J are top views of various embodiments of extension tubes configured for use with the adapter.

FIG. 3E shows still another embodiment of an adapter 10e having a gripping insert 41 positioned within the inner channel 42 to enhance the gripping capability of the adapter 10e. The adapter 10e is designed to allow the gripping insert 41 to assume a nested configuration within the adapter 10e. Along these lines, the inner channel 42 of the adapter 10e defines a first recess 43 disposed at one end of the inner channel 42 and a second recess 45 disposed at the opposite end of the inner channel 42. The gripping insert 41 includes a first flange 47 which fits within the first recess 43 and a second flange 49 that fits within the second recess 45 and a tubular body 51 that extends between the first and second flanges 47, 49 and defines a gripping member channel 53. The adapter 10e is preferably formed from a resilient material which is deformable to allow the gripping insert 41 to be placed therein, yet assumes the depicted configuration when the gripping insert 41 is completely inserted within the adapter 10e. When the gripping insert 41 is placed within the adapter 10e, the gripping member channel 53 is preferably coaxially aligned with the inner channel 42 of the adapter 10e, such that when the extension tubes 14a, 14b is inserted into the adapter 10d, the extension tubes 14a, 14b pass through the gripping member channel 53. The gripping insert 51 additionally includes a plurality of gripping members 55 extending into the gripping member channel 53 to "grip" or engage with the extension tubes 14a, 14b when the extension tubes 14a, 14b are inserted therein. In the exemplary embodiment, the gripping members 55 include teeth which extend into the gripping member channel 53, although it is understood that the gripping member(s) 55 may define other shapes or configurations, such as a helical protrusion, annular protrusions, a reduced diameter, a grippable material, threads or other gripping elements known by those skilled in the art.

Figures 4A, 4B, 4C, 4D, 4E:
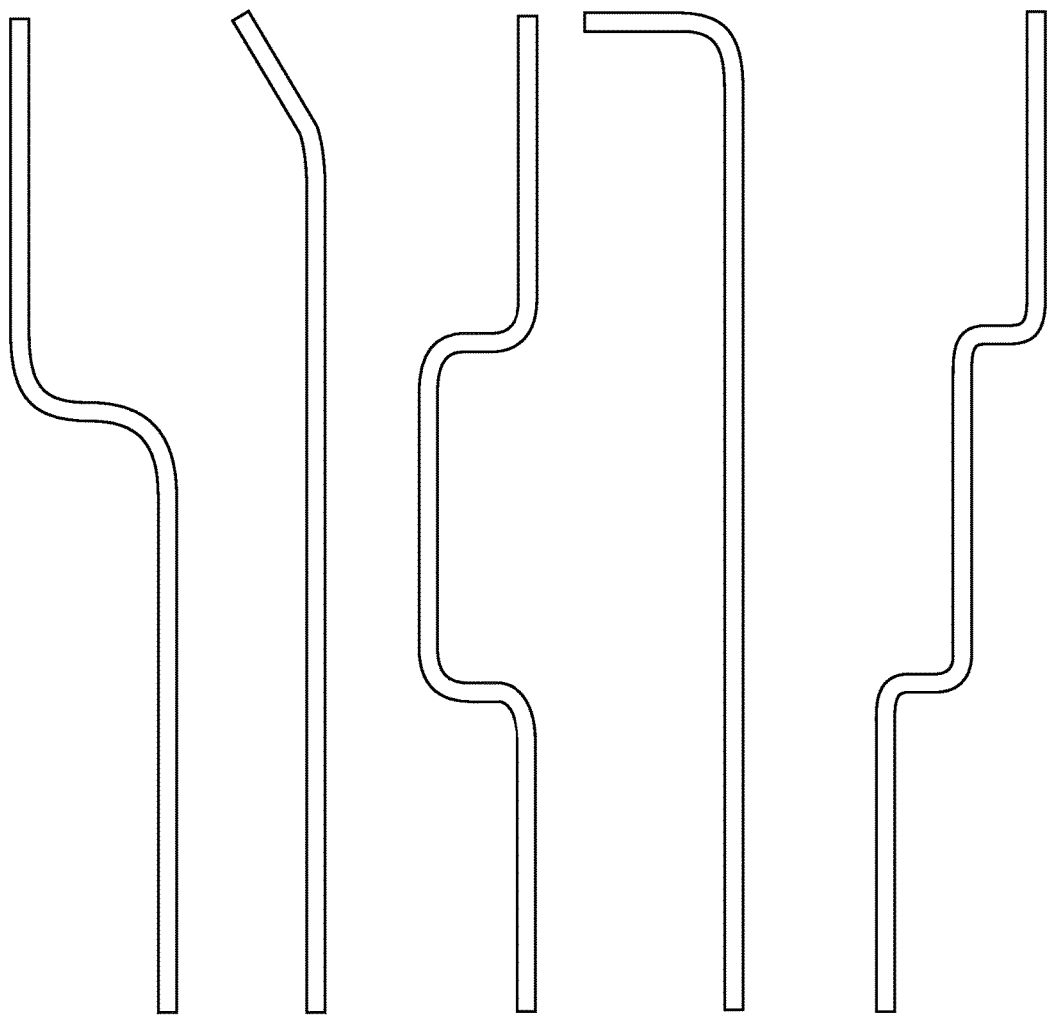

Referring now to FIGS. 4A-4J, there is shown several different embodiments of extension tubes which may be used in connection with the adapter body. Each extension tube defines a first end portion and an opposing second end portion and a middle portion extending between the first and second end portions. The extension tube may define several different configurations to facilitate disbursement of the pressurized fluid to hard to reach areas, such as around corners and in tight spaces. For instance, the extension tube may have a generally 90° bend, as is shown in FIG. 4A, or may be substantially linear. Furthermore, the extension tube may have two generally 90° bends, as is shown in FIGS. 4C and 4E. FIG. 4B shows an extension tube having a bend which is each less than 90°. It is additionally contemplated that the length of the extension tube may be altered without departing from the spirit and scope of the present invention.

It is contemplated that the extension tubes may be selectively inserted within the inner channel of the adapter body to connect the extension tube to another extension tube. Several different extension tubes may be sold as a kit, and may be selectively interchanged as needed.

It is contemplated that the extension tubes may be selectively inserted within the inner channel of the adapter body to connect the extension tube to the adapter body and the spray nozzle. Several different extension tubes may be sold as a kit, and may be selectively interchanged as needed.

Furthermore, it is also contemplated that the adapter and the extension tube(s) may be packaged as a kit for sale. The kit may include one or more configurations of the adapter (such as those shown in FIGS. 3A-3E) as well as one or more configurations of the extension tube (such as those shown in FIGS. 4A-4J). It is also contemplated that the kit may include one or more dampeners, as described above.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combinations described herein. Thus, the scope of the claims is not to be limited by the illustrated embodiments.

What is claimed is:

1. An adapter usable with an aerosol can extension tube and configured to be engageable with two extension tubes to securely and fluidly connect the two extension tubes, the adapter comprising:
   an adapter body made from a material with a Shore hardness rating that allows for an expandable friction fit and prevents backwash of a pressurized air/fluid mixture and the adapter from being blown off of the extension tube when the pressurized air/fluid mixture is being emitted from the extension tube, wherein the adapter includes a first surface, a second surface, and a side surface extending between the first and second surfaces, the adapter body defining:
   an opening on the first and second surfaces, the diameter sized at each opening to allow an extension tube to be insertable therein to create the-a friction tight engagement between the extension tube and the adapter body;
   a continuous inner channel extending from the first surface to the second surface; and,
   a constriction section that narrows the continuous inner channel to a diameter less than that of the openings on the first and second surfaces and is substantially equal to the inner diameter of the extension tube such that when an extension tube is inserted into the openings of the first and second surfaces of the adapter, the tube is stopped from crossing the constriction section, and a continuous, uniform flow channel of a substantially constant diameter is created.

2. The adapter recited in claim 1, wherein the adapter body is formed from a rubber material.

3. The adapter recited in claim 1, wherein the adapter body is formed from a resilient material.

4. The adapter recited in claim 1, wherein the inner channel is configured to allow an extension tube to be inserted therein by a first force and to allow the extension tube to be removed by a second force equal to or greater than the first force.

5. The adapter recited in claim 1, wherein the adapter body includes a plurality of projections extending to the inner channel to facilitate the friction tight engagement between the adapter body and an extension tube.

6. The adapter recited in claim 1, wherein the adapter body includes a plurality of annular protrusions extending to the inner channel to facilitate the friction tight engagement between the adapter body and an extension tube.

7. The adapter recited in claim 1, wherein the adapter body includes a plurality of helical protrusions extending to the inner channel to facilitate the friction tight engagement between the adapter body and an extension tube.

* * * * *